No. 883,880. PATENTED APR. 7, 1908.
C. P. HENSLEY & F. H. BRYANT.
GAS FURNACE.
APPLICATION FILED JULY 24, 1907.
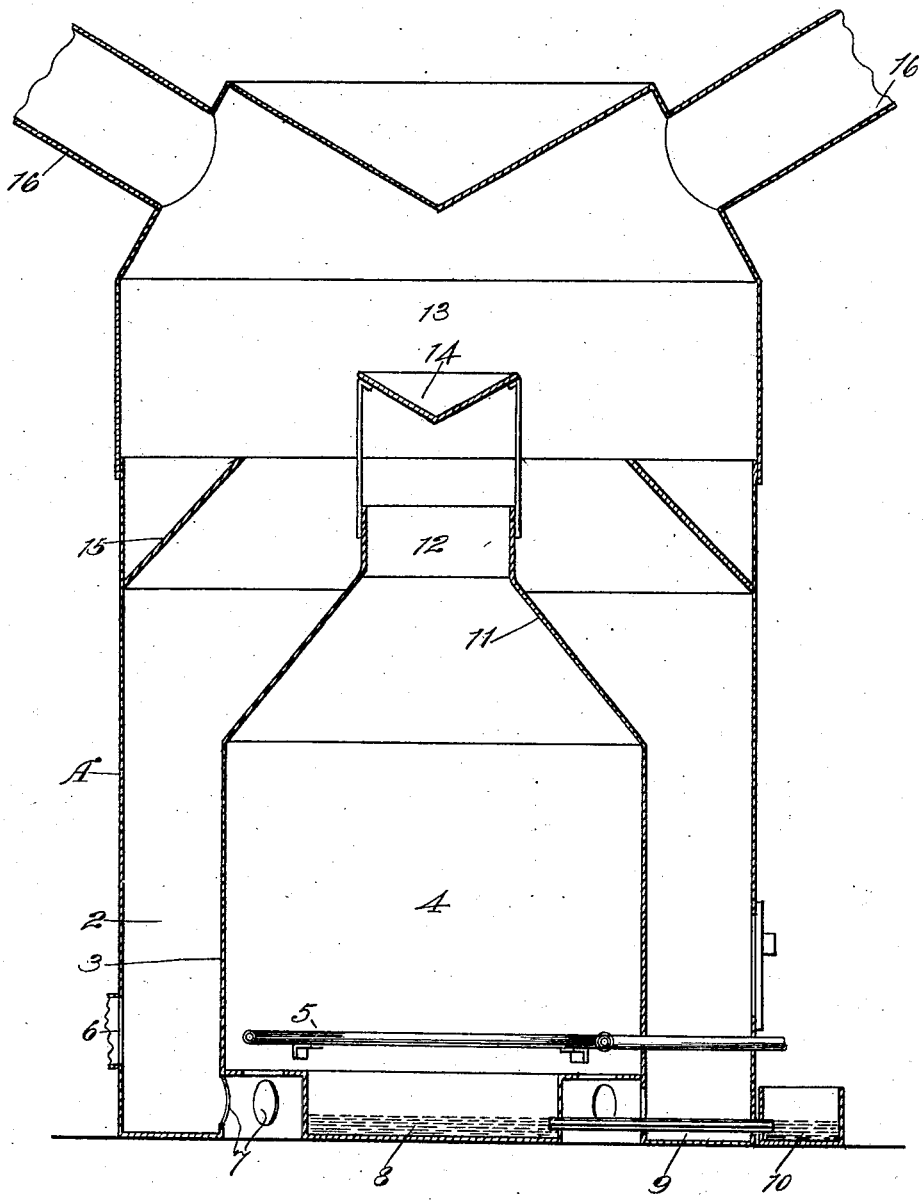
WITNESSES
INVENTORS
Calvin P. Hensley and
Frank H. Bryant,
BY
ATTORNEY

UNITED STATES PATENT OFFICE.

CALVIN P. HENSLEY AND FRANK H. BRYANT, OF SAN FRANCISCO, CALIFORNIA, ASSIGNORS TO NATIONAL FURNACE COMPANY, OF SAN FRANCISCO, CALIFORNIA, A CORPORATION OF CALIFORNIA.

GAS-FURNACE.

No. 883,880.　　　　Specification of Letters Patent.　　　Patented April 7, 1908.

Application filed July 24, 1907. Serial No. 385,238.

*To all whom it may concern:*

Be it known that we, CALVIN P. HENSLEY and FRANK H. BRYANT, both citizens of the United States, residing at the city and county of San Francisco and State of California, have invented new and useful Improvements in Gas-Furnaces, of which the following is a specification.

Our invention relates to air heating furnaces and especially gas furnaces. Its object is to provide a furnace which will be extremely cheap of construction, economical to install and to operate, and which will have a large heating capacity.

The invention consists of the parts and the construction and combination of parts as hereinafter more fully described and claimed, having reference to the accompanying drawings, in which the figure is a central vertical section of the furnace.

A represents an outer casing or shell made of sheet-metal, preferably built up of suitable interlocked sections. Inside of this shell and spaced therefrom to provide an air passage 2 is a shell 3 which incloses a combustion chamber 4. Inside this combustion chamber is disposed a suitable gas burner, as 5.

Fresh air is admitted to the passageway 2 through a suitable conduit 6, and air for purposes of combustion is admitted into the combustion chamber from the passageway 2 through suitable openings 7 near the bottom of the shell 3. Except as the air enters the furnace through the conduit 6, it is designed that the bottom of the furnace shall otherwise be closed.

The bottom of the combustion chamber is adapted as a water reservoir 8, and which reservoir is open at the top to the heated space above and is connected by a feed pipe 9 with a tank or water-containing receptacle 10, disposed just outside the furnace. The pan 10 is kept suitably filled, and as the water in the pan 8 is depleted by evaporation, the pan 8 is replenished automatically from the tank 10.

The top of the shell 3 has a conical dome 11 with a central discharge outlet 12 into the hot air dome space 13 at the top of the furnace. The deflector, in the form of an inverted cone 14, is mounted above the outlet 12, so as to distribute radially in all directions the heat rising from the burner 5.

Arranged a suitable distance above the shell 3 and concentric with the conical top 11 of shell 3 is a deflector 15 in the form of a frustum of a hollow cone, and carried by the casing A. The function of this deflector 15 is to direct the fresh air rising through the passageway 2 inwardly in counter-current to the conical sheet of heated gases rising from the combustion chamber and distributed by the deflector 14. The arrangement of the deflectors 14—15 with the contracted hot air opening 12 results in a thorough commingling of the heat and of the cold air.

The combustion chamber being entirely air jacketed, and the deflector 15 being connected with the outside casing only at its lower edge, directs the cold air inwardly over the combustion chamber; and since the air can circulate in beyond the deflector 15 there is practically little loss of heat from the furnace by radiation.

In this construction separate air flues in the furnace are dispensed with, and consequently a very large heating capacity results. The draft to the burners is carefully regulated so that combustion is complete.

By mixing the hot particles with such a large supply of fresh air constantly received into the furnace, no injurious effects result from the mixture of the hot particles and the hot air which is delivered through the service pipes 16.

Having thus described our invention, what we claim and desire to secure by Letters Patent is—

1. In a gas furnace, the combination of an outside cylindrical shell, an inside shell concentric therewith and separated therefrom to inclose an air passageway, said inner shell inclosing a combustion chamber having draft inlets at the bottom opening into said passageway, and said combustion chamber having a contracted outlet opening into the top of the furnace, a deflector arranged above said inlet for radially distributing the heated particles rising from the combustion chamber, and a deflector in the form of a frustum of a cone secured to the outer casing, and having its top terminating above the outlet from the combustion chamber and arranged to direct the hot air rising in said passageway inwardly in counter-current to the heat passing through said outlet from the combustion chamber, and a burner in the combustion chamber.

2. In a gas furnace, the combination of an outside cylindrical shell, an inside shell concentric therewith and separated therefrom to inclose an air passageway, said inner shell inclosing a combustion chamber having draft inlets at the bottom opening into said passageway, and said combustion chamber having a contracted outlet opening into the top of the furnace, a deflector arranged above said outlet for radially distributing the heated particles rising from the combustion chamber, and a deflector in the form of a frustum of a cone secured to the outer casing, and having its top terminating above the outlet from the combustion chamber and arranged to direct the hot air rising in said passageway inwardly in counter-current to the heat passing through said outlet from the combustion chamber, a burner in the combustion chamber, said combustion chamber having an open top reservoir in its bottom, and connections between said reservoir and the outside source of supply.

In testimony whereof we have hereunto set our hands in presence of two subscribing witnesses.

CALVIN P. HENSLEY.
FRANK H. BRYANT.

Witnesses:
HUGH D. NEILL,
CHARLES FRANCEE.